Dec. 20, 1955 W. F. PUNTE 2,727,483
METHOD OF FORMING CAN BODIES FROM SHEET METAL BLANKS
Filed Aug. 20, 1954 3 Sheets-Sheet 2

INVENTOR
WILLIAM F. PUNTE

BY Mason, Porter, Diller & Stewart

ATTORNEYS

Dec. 20, 1955    W. F. PUNTE    2,727,483
METHOD OF FORMING CAN BODIES FROM SHEET METAL BLANKS
Filed Aug. 20, 1954    3 Sheets-Sheet 3

INVENTOR
WILLIAM F. PUNTE

BY *Mason, Porter, Diller & Stewart*

ATTORNEYS

United States Patent Office 2,727,483
Patented Dec. 20, 1955

2,727,483

METHOD OF FORMING CAN BODIES FROM SHEET METAL BLANKS

William F. Punte, Chicago, Ill., assignor to Continental Can Company, Inc., New York, N. Y., a corporation of New York Application August 20, 1954, Serial No. 451,267

3 Claims. (Cl. 113—120)

The invention relates to new and useful improvements in a method of forming can bodies from sheet metal blanks.

An object of the invention is to provide a method of forming a sheet metal can body having the edge portions of the body blank joined by a side seam wherein the edge portions are lapped and joined by spot welding at intervals and by a solder bond extending from one end of the side seam to the other.

A further object of the invention is to provide a method of the above type wherein the edge portions are bent outwardly and placed face to face and spot welded at spaced intervals and subsequently folded flat against the body wall and solder bonded together and to the body wall from one end of the side seam to the other.

A still further object of the invention is to provide a method of forming a can body from a sheet metal blank wherein the blank is notched so as to provide two thicknesses of metal only in the side seam in the region where the body is to be flanged and a closure end double seamed thereto.

These and other objects will in part be obvious and will in part be hereinafter more fully disclosed.

Figure 1:
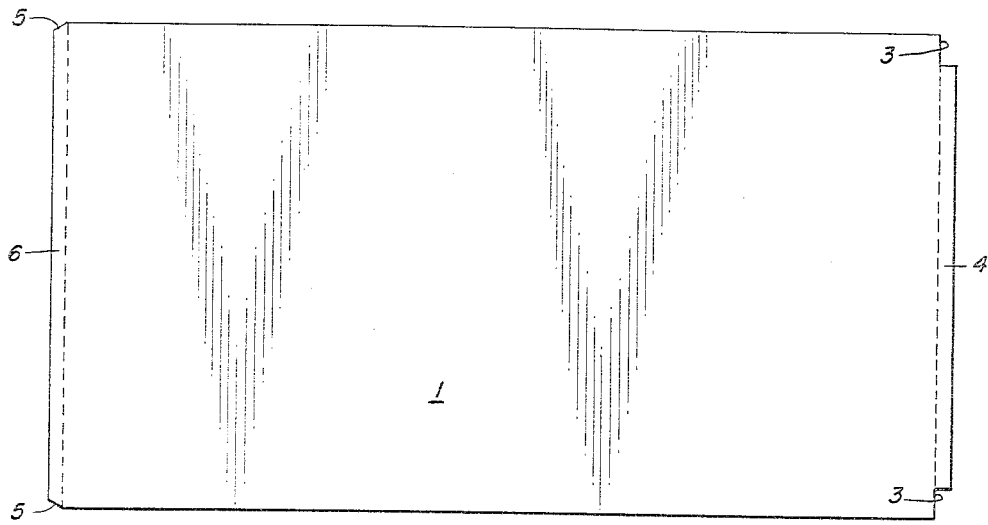
Figure 1 is a plan view of the body blank which is notched and clipped.
Figure 2:
Figure 2 is an edge view of the body blank showing the end portions as bent downwardly in the same direction and at right angles to the body blank.
Figure 3:
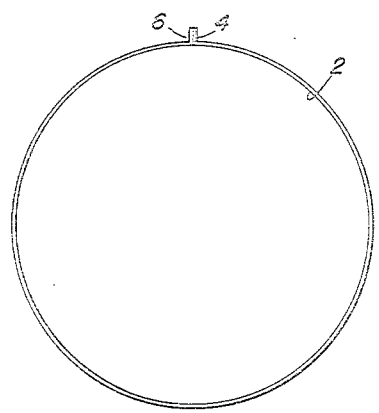
Figure 3 is an end view of the formed body with the bent portions brought into intimate contact and extending radially outward from the body wall.
Figure 4:
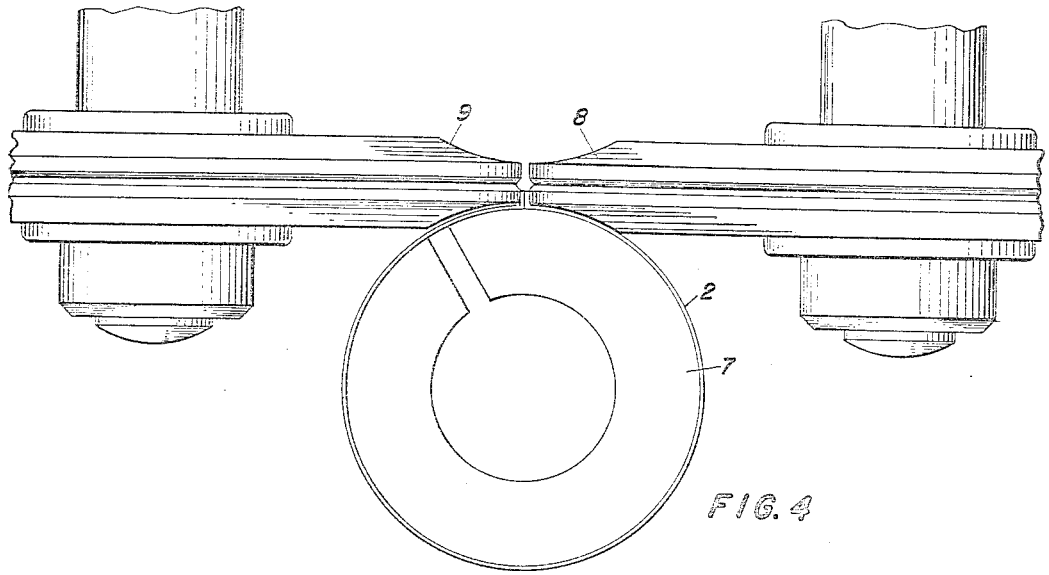
Figure 4 is a view showing diagrammatically the spot welding at spaced intervals of the upstanding portions of the side seam and the welding rolls for spot welding the same.

The invention relates to a method of forming can bodies from sheet metal blanks. The method consists in providing a body blank 1 which is to be shaped to form the can body. As herein illustrated the body 2 which is formed from the blank is cylindrical. The blank is cut at one end thereof so as to provide notches 3, 3 at the ends of the side seam. The end portion 4 is bent downwardly at right angles to the body blank while in the flat. At the other end of the blank the corners are clipped as indicated at 5, 5. This edge portion of the body blank is bent downwardly as indicated at 6. The two bent portions extend downwardly in the same direction. The body blank is then formed into a cylindrical body and the bent portions 4 and 6 are brought face to face and extend outwardly in a radial direction. The blank is bent into its cylindrical form around the horn 7 which may be of any suitable construction. The formed body with its upright edge portions is fed along the horn between welding rolls 8 and 9 which likewise are of any suitable character and will not be further described.

Figure 5:
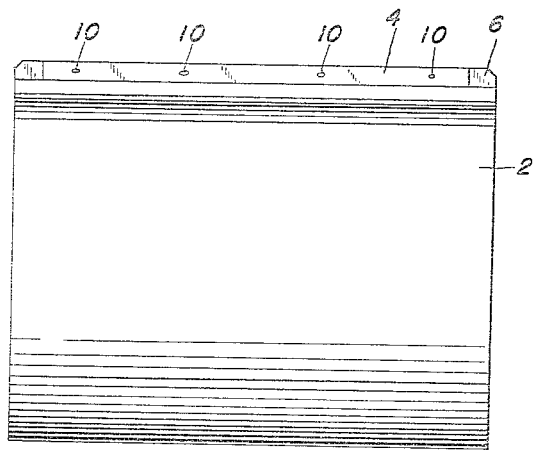
Figure 5 is a side view of the can body showing the upstanding lapped portions as spot welded at spaced intervals.
Figure 6:
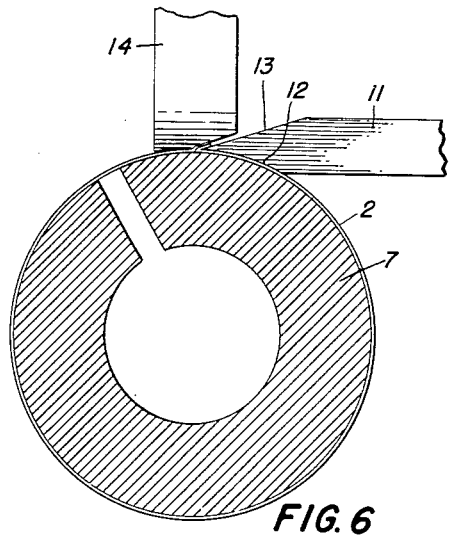
Figure 6 is a view showing more or less diagrammatically the horn on which the body is formed into body shape, the angle bar onto which the welded upstanding portions are folded at an acute angle to the body wall and the presser roll for folding the edges into contact with the angle bar.
Figure 6A:
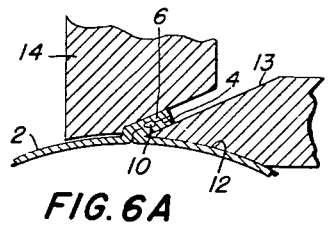
Figure 6a is a view on a larger scale showing the welded lapped portions as folded into contact with the forming angle bar.

As the can body passes along the horn with the edge portions between the electrodes, the upturned portions are secured together by spot welding, the welding spots being shown at 10, 10 in Figure 5. The body after being spot welded is fed along the horn to a station where the upstanding welded portions are folded down to an acute angle relative to the body wall. At this station there is an iron 11 which is shaped on its underface at 12 to conform to the body wall and on its upper face it is tapered at 13 to bring the end of the iron to an edge which can be placed close up to the point where the underlapped portion 4 joins the body wall. At this station the body passes beneath the forming roll 14 which engages the upturned edges and folds them over into contact with the tapered wall 13 of the iron 11. The body then passes along the horn to a third station where the presser roll 15 which is shaped on its periphery so as to fold the welded together lapped edges into intimate contact with the outer face of the body wall.

Figure 7:
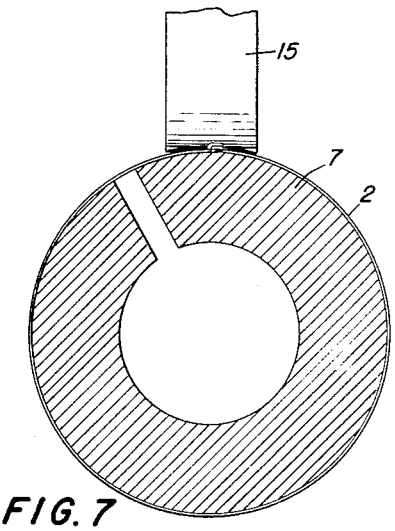
Figure 7 is a view showing more or less diagrammatically the body horn, the body thereon and the presser roll for folding the welded lapped portions into intimate contact with the body wall.
Figure 7A:
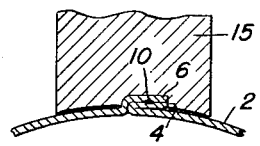
Figure 7a is an enlarged view of the can body and presser roller showing the edge portions folded into intimate contact with the body wall.

In Figure 7a the welded together lapped edges are shown as folded down into intimate contact with the body wall. The can body is then passed through a solder bonding machine and a solder bond applied to the ends of the lapped portion so that solder will sweat into the side seam between the lapped portions 4 and 6. It will also sweat into the side seam so as to bond together the lapped section 4 and the body wall. The solder bonding material is indicated at 16. This solder bonding material not only sweats into the side seam but it also forms a fillet 16a which covers the raw edges of the metal.

Figure 10:
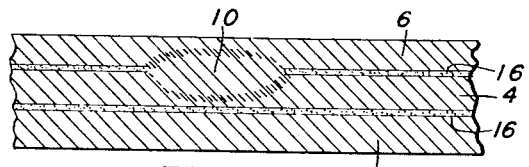
Figure 10 is an enlarged longitudinal sectional view of the side seam showing the solder bond and one of the spot welds.

Figure 10 shows a longitudinal view through the finished side seam.

Referring to Figure 1, it is noted that the body blank is notched at 3, 3. This shortens the bent portion 4 so that when the body blank is shaped into body form and lapped relation there will be only two thicknesses at the end of the seam. The lap section 6 will contact the body wall 2 directly. This greatly facilitates the flanging of the body and the joining of the body to the closure ends by double seaming. The clipping of the ends at 5, 5 also assists in the double seaming.

Figure 11:
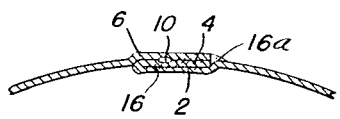
Figure 11 is a view showing a slightly modified form of the invention in that the seam is bumped so that it projects in part inwardly of the can body and in part outwardly of the can body.

In Figure 11 there is shown a slightly different form of the arrangement of the side seam relative to the body wall. In this form the body wall during bumping has been offset inwardly so that the seam extends inwardly beyond the inner surface of the body wall and also outwardly beyond the outer surface of the body wall. Otherwise the structure is the same as that described above.

Figure 8:
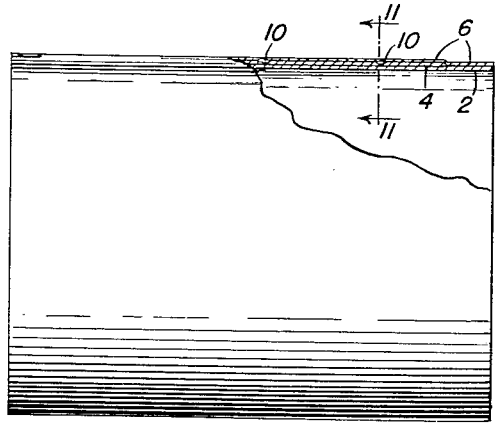
Figure 8 is a side view of the completed body wall showing a portion of the side seam in longitudinal section.
Figure 9:
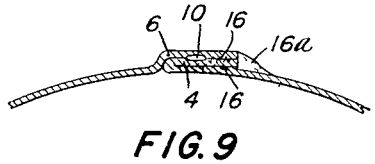
Figure 9 is a sectional view on the line 11, 11 of Figure 8.

The steps of the improved method of making the can body consists in notching the body blank and forming the downwardly projecting portions at each end of the blank while the blank is in the flat. The blank is then shaped about a horn and these downwardly projecting portions are swung upwardly toward each other and brought face to face in intimate contact and extend outwardly radially of the body wall. The next step in the method consists in feeding the blank along a horn and spot welding the upstanding lapped portions at spaced intervals. The can body is then fed further along the horn to a station where the welded portions are folded downwardly to an acute angle relative to the body wall, after which the body is fed underneath the presser roll which completes the folding down of the welded portions until they are flat against the body wall and in intimate contact therewith. The body is then passed through a solder bonding machine where solder is applied so that it will sweat inbetween the lapped sections and also inbetween the two lapped sections and the body wall. This solder bond extends fron one end of the side seam to the other. During the forming of the can body the ends of the downwardly folded portion 6 are brought into lapped contact relation with the body but inasmuch as the lapped portion 4 is shortened by the notching at 3 as shown in Figure 1, there will be only two thicknesses of metal at the ends of the lapped seam, as shown in Figure 8.

It is obvious that minor changes in the steps of the method may be made without departing from the spirit of the invention as set forth in the appended claims.

I claim:

1. The method of forming a can body comprising, shaping a sheet metal body blank to provide two seam margins one of which is cut away at each end where the closure ends are to be double seamed to the body, bending the seam margins in the same direction and at right angles to the blank, shaping the body about a horn and placing the bent seam margins face to face to form a lapped seam with the said bent edge portions extending radially outwardly from the body wall, spot welding the radially projecting portions at spaced intervals, folding said welded portions to an acute angle relative to the body wall, bumping said folded edges into intimate contact with the body wall to provide two thicknesses of metal at the positions of the cut away portions and three thicknesses of metal intermediately of said cut away portions, and solder bonding said edge portions to each other and to the body wall.

2. The herein described method of forming a can body which comprises, providing a sheet metal body blank with parallel lap seam margins one extending full length of the blank and one notched away the full lap seam width at each end where closure ends are to be double seamed to the body, shaping the body about a horn with said margins contacting to provide a radially projecting seam having a single thickness adjacent each end and lapped thicknesses between said single thickness end portions, spot welding said lapped thicknesses, folding the spot welded thicknesses over onto an adjacent body wall portion, and solder bonding the spot welded thicknesses together and to said body wall portion to provide a lapped seam having two solder bonded thicknesses at each end where closure ends are to be double seamed to the body and three solder bonded thicknesses intermediately of said two thickness end portions.

3. The method defined in claim 2 wherein the folding of the lapped seam thicknesses onto the adjacent body wall portion is carried out in two stages, first by a partial folding of the lapped and radially projecting thicknesses to an acute angle relative to said adjacent body wall portion, and then by bumping the seam structure to bring the lapped thicknesses into intimate contact with each other and the opposed body wall portion and the endwise extended seam margin portions provided by the end notching into intimate contact directly with the opposed body wall portion, and wherein the solder bonding is carried out after thus bringing the seam structure components into intimate contact.

References Cited in the file of this patent

UNITED STATES PATENTS

| 861,242 | Edison | July 23, 1907 |
| 1,542,663 | Brenzinger | June 16, 1925 |
| 2,156,028 | Punte | Apr. 25, 1939 |

FOREIGN PATENTS

| 305,841 | Germany | May 30, 1918 |